(12) United States Patent
Thompson et al.

(10) Patent No.: US 11,131,785 B2
(45) Date of Patent: Sep. 28, 2021

(54) METHOD AND SYSTEM FOR DEPLOYMENT OF OCEAN BOTTOM SEISMOMETERS

(71) Applicant: Magseis FF LLC, Houston, TX (US)

(72) Inventors: James N. Thompson, Sugar Land, TX (US); Clifford H. Ray, Fulshear, TX (US); Glenn D. Fisseler, Sugar Land, TX (US); Roger L. Fyffe, Sugar Land, TX (US)

(73) Assignee: Magseis FF LLC, Houston, TX (US)

( * ) Notice: Subject to any disclaimer, the term of this patent is extended or adjusted under 35 U.S.C. 154(b) by 122 days.

(21) Appl. No.: 16/782,180

(22) Filed: Feb. 5, 2020

(65) Prior Publication Data

US 2020/0174148 A1 Jun. 4, 2020

Related U.S. Application Data

(63) Continuation of application No. 14/158,601, filed on Jan. 17, 2014, now Pat. No. 10,591,624, which is a
(Continued)

(51) Int. Cl.
*G01V 1/38* (2006.01)
*B63B 22/00* (2006.01)
(Continued)

(52) U.S. Cl.
CPC ............ *G01V 1/3852* (2013.01); *B63B 22/00* (2013.01); *B63B 22/18* (2013.01); *B63C 11/00* (2013.01);
(Continued)

(58) Field of Classification Search
CPC .............. G01V 1/3852; G01V 1/3861; B63G 2008/005; B63C 11/00; B63B 2211/02
See application file for complete search history.

(56) References Cited

U.S. PATENT DOCUMENTS

| 2,981,454 A | 4/1961 | Dickinson et al. |
| 3,165,899 A | 1/1965 | Shatto, Jr. |

(Continued)

FOREIGN PATENT DOCUMENTS

| GB | 2 392 245 | 2/2004 |
| WO | WO-02/37140 A2 | 5/2002 |

(Continued)

OTHER PUBLICATIONS

Ex Parte Quayle Office Action for U.S. Appl. No. 15/638,348 dated Aug. 15, 2019 (8 pages).
(Continued)

*Primary Examiner* — Tara Mayo-Pinnock
(74) *Attorney, Agent, or Firm* — Foley & Lardner LLP

(57) ABSTRACT

Systems and methods for deployment of ocean bottom seismic receivers into a body of water having a surface and a seabed. The system can include a remote operated vehicle (ROV) comprising a first wireless communication device. The system can include a seismic data receiver deployed on the seabed comprising a second wireless communication device. The first wireless communication device can be configured to communicate with the second wireless communication device. The ROV can move to a position adjacent to the seismic data receiver. The ROV can establish a wireless link with the seismic data receiver via the first communication device and second wireless communication device.

18 Claims, 7 Drawing Sheets

Related U.S. Application Data continuation of application No. 13/195,198, filed on Aug. 1, 2011, now Pat. No. 8,632,274, which is a continuation of application No. 11/711,353, filed on Feb. 27, 2007, now Pat. No. 8,075,226, which is a continuation of application No. 11/037,031, filed on Jan. 17, 2005, now Pat. No. 8,534,959.

(51) Int. Cl.
  *B63B 22/18* (2006.01)
  *B63C 11/00* (2006.01)
  *B63G 8/00* (2006.01)

(52) U.S. Cl.
  CPC .............. *B63G 8/00* (2013.01); *B63G 8/001* (2013.01); *G01V 1/3861* (2013.01); *B63B 2211/02* (2013.01); *B63G 2008/004* (2013.01); *B63G 2008/005* (2013.01); *B63G 2008/007* (2013.01)

(56) References Cited

U.S. PATENT DOCUMENTS

| | | |
|---|---|---|
| 3,297,982 A | 1/1967 | Allan |
| 3,496,532 A | 2/1970 | Thigpen |
| 3,578,101 A | 5/1971 | Larson |
| 3,704,596 A | 12/1972 | Lloyd |
| 3,720,433 A | 3/1973 | Rosfelder |
| 3,886,494 A | 5/1975 | Kostelnicek et al. |
| 3,912,317 A | 10/1975 | Ohnaka |
| 3,951,231 A | 4/1976 | Leonard |
| 3,968,855 A | 7/1976 | Mollere |
| 4,010,619 A | 3/1977 | Hightower et al. |
| 4,076,131 A | 2/1978 | Dahlstrom et al. |
| 4,144,520 A | 3/1979 | McNeel |
| 4,272,835 A | 6/1981 | Flood et al. |
| 4,300,220 A | 11/1981 | Goff et al. |
| 4,380,059 A | 4/1983 | Ruehle |
| 4,398,276 A | 8/1983 | Kruppenbach |
| 4,422,164 A | 12/1983 | Bowden et al. |
| 4,458,339 A | 7/1984 | Wason |
| 4,462,094 A | 7/1984 | Bowden et al. |
| 4,486,865 A | 12/1984 | Ruehle |
| 4,516,227 A | 5/1985 | Wener et al. |
| 4,525,819 A | 6/1985 | Hefer |
| 4,613,821 A | 9/1986 | Sternberg et al. |
| 4,666,338 A | 5/1987 | Schoepf |
| 4,674,915 A | 6/1987 | Shatto, Jr. |
| 4,692,906 A | 9/1987 | Neeley |
| 4,710,060 A | 12/1987 | Kamarainen |
| 4,726,315 A | 2/1988 | Bell et al. |
| 4,813,029 A | 3/1989 | Erich et al. |
| 4,821,665 A | 4/1989 | Matthias et al. |
| 4,828,223 A | 5/1989 | Russell et al. |
| 4,839,872 A | 6/1989 | Gragnolati et al. |
| 4,849,947 A | 7/1989 | Baule et al. |
| 4,884,248 A | 11/1989 | Laster et al. |
| 4,956,822 A | 9/1990 | Barber et al. |
| 4,979,150 A | 12/1990 | Barr |
| 5,003,517 A | 3/1991 | Greer, Jr. |
| 5,010,531 A | 4/1991 | McNeel |
| 5,025,423 A * | 6/1991 | Earp .................. G01S 7/539 367/135 |
| 5,067,112 A | 11/1991 | Meek et al. |
| 5,113,377 A | 5/1992 | Johnson |
| 5,119,345 A | 6/1992 | Woo et al. |
| 5,138,538 A | 8/1992 | Sperling |
| 5,154,561 A | 10/1992 | Lee |
| 5,157,636 A | 10/1992 | Bjerkoy |
| 5,163,028 A | 11/1992 | Barr et al. |
| 5,164,922 A | 11/1992 | Cappelen et al. |
| 5,189,642 A | 2/1993 | Donoho et al. |
| 5,191,526 A | 3/1993 | Laster et al. |
| 5,197,716 A | 3/1993 | Zibilich et al. |
| 5,231,252 A | 7/1993 | Sansone |
| 5,231,609 A | 7/1993 | Gaer |
| 5,253,223 A | 10/1993 | Svenning et al. |
| 5,271,953 A | 12/1993 | Litteral |
| 5,274,605 A | 12/1993 | Hill |
| 5,284,323 A | 2/1994 | Pawkett |
| 5,346,352 A | 9/1994 | Ito |
| 5,365,492 A | 11/1994 | Dragoset, Jr. |
| 5,432,895 A | 7/1995 | Myers |
| 5,442,590 A | 8/1995 | Svenning et al. |
| 5,469,408 A | 11/1995 | Woo |
| 5,488,920 A | 2/1996 | Gjestrum |
| 5,500,832 A | 3/1996 | Berryhill |
| 5,548,562 A | 8/1996 | Helgerud et al. |
| 5,550,788 A | 8/1996 | Pavone et al. |
| 5,623,455 A | 4/1997 | Norris |
| 5,655,753 A | 8/1997 | Berges et al. |
| 5,671,344 A | 9/1997 | Stark |
| 5,724,241 A | 3/1998 | Wood et al. |
| 5,747,754 A | 5/1998 | Svenning et al. |
| 5,761,152 A | 6/1998 | Jacobsen et al. |
| 5,774,417 A | 6/1998 | Corrigan et al. |
| 5,811,055 A | 9/1998 | Geiger |
| 5,841,733 A | 11/1998 | Bouyoucos et al. |
| 5,894,450 A | 4/1999 | Schmidt et al. |
| 5,930,730 A | 7/1999 | Marfurt et al. |
| 6,002,640 A | 12/1999 | Harmon |
| 6,012,018 A | 1/2000 | Hornbuckle |
| 6,021,090 A | 2/2000 | Gaiser et al. |
| 6,024,344 A | 2/2000 | Buckley et al. |
| 6,028,817 A | 2/2000 | Ambs |
| 6,044,786 A | 4/2000 | Dudley et al. |
| 6,049,507 A | 4/2000 | Allen |
| 6,070,129 A | 5/2000 | Grouffal et al. |
| 6,070,857 A | 6/2000 | Dragsund et al. |
| 6,101,448 A | 8/2000 | Ikelle et al. |
| 6,109,427 A | 8/2000 | Hosch et al. |
| 6,141,622 A | 10/2000 | Keller et al. |
| 6,151,556 A | 11/2000 | Allen |
| 6,208,247 B1 | 3/2001 | Agre et al. |
| 6,215,499 B1 | 4/2001 | Neff et al. |
| 6,223,675 B1 | 5/2001 | Watt et al. |
| 6,260,504 B1 | 7/2001 | Moles et al. |
| 6,269,763 B1 | 8/2001 | Woodland |
| 6,285,956 B1 | 9/2001 | Bennett et al. |
| 6,292,754 B1 | 9/2001 | Thomsen |
| 6,307,808 B1 | 10/2001 | Schmidt |
| 6,314,371 B1 | 11/2001 | Monk |
| 6,350,085 B1 | 2/2002 | Bath et al. |
| 6,353,577 B1 | 3/2002 | Orban et al. |
| 6,366,537 B1 | 4/2002 | Sambuelli et al. |
| 6,474,254 B1 | 11/2002 | Ambs et al. |
| 6,494,141 B2 | 12/2002 | Montambault et al. |
| 6,532,190 B2 | 3/2003 | Bachrach |
| 6,584,406 B1 | 6/2003 | Harmon et al. |
| 6,588,980 B2 | 7/2003 | Worman et al. |
| 6,604,483 B1 | 8/2003 | Johnsen et al. |
| 6,607,050 B2 | 8/2003 | He et al. |
| 6,612,397 B2 | 9/2003 | Sparrevik et al. |
| 6,625,083 B2 | 9/2003 | Vandenbroucke |
| 6,657,921 B1 | 12/2003 | Ambs |
| 6,701,818 B1 | 3/2004 | O'Dwyer |
| 6,722,252 B1 | 4/2004 | O'Dwyer |
| 6,738,715 B2 | 5/2004 | Shatilo et al. |
| 6,751,162 B2 | 6/2004 | Dominguez et al. |
| 6,791,901 B1 | 9/2004 | Robertsson et al. |
| 6,796,261 B2 | 9/2004 | Colyer |
| 6,814,179 B2 | 11/2004 | Corrigan et al. |
| 6,846,133 B2 | 1/2005 | Martin et al. |
| 6,850,462 B2 | 2/2005 | McDaniel et al. |
| 6,912,903 B2 | 7/2005 | Hamblen et al. |
| 6,934,219 B2 | 8/2005 | Burkholder et al. |
| 6,951,138 B1 | 10/2005 | Jones |
| 6,957,929 B1 | 10/2005 | Rachel et al. |
| 6,975,560 B2 | 12/2005 | Berg et al. |
| 6,977,867 B2 | 12/2005 | Chamberlain |
| 7,025,534 B2 | 4/2006 | Martin et al. |
| 7,042,803 B2 | 5/2006 | Kutty et al. |
| 7,096,811 B2 | 8/2006 | Clarke et al. |

(56) References Cited

U.S. PATENT DOCUMENTS

| | | |
|---|---|---|
| 7,104,728 B2 | 9/2006 | Luc et al. |
| 7,210,556 B2 | 5/2007 | Bath et al. |
| 7,224,641 B2 | 5/2007 | Nas |
| 7,286,442 B2 | 10/2007 | Ray et al. |
| 7,310,287 B2 | 12/2007 | Ray et al. |
| 7,324,406 B2 | 1/2008 | Berg |
| 7,463,549 B2 | 12/2008 | Naess |
| 7,510,349 B2 | 3/2009 | Berg |
| 7,529,627 B2 | 5/2009 | Lisitsyn et al. |
| 7,646,670 B2 | 1/2010 | Maxwell et al. |
| 7,675,821 B2 | 3/2010 | Berg et al. |
| 7,728,596 B2 | 6/2010 | Lisitsyn et al. |
| 7,965,583 B2 | 6/2011 | Thomas |
| 8,076,941 B2 | 12/2011 | Tulupov et al. |
| 8,076,942 B2 | 12/2011 | Tulupov et al. |
| 8,259,534 B2 | 9/2012 | Lisitsyn et al. |
| 8,576,658 B2 | 11/2013 | Thomas |
| 9,052,380 B2 | 6/2015 | Winter et al. |
| 9,090,319 B2 | 7/2015 | Brizard et al. |
| 9,151,857 B2 | 10/2015 | Manin et al. |
| 9,381,986 B2 | 7/2016 | Brizard |
| 9,429,671 B2 | 8/2016 | Rokkan et al. |
| 9,448,311 B2 | 9/2016 | Maxwell |
| 9,457,879 B2 | 10/2016 | Brizard |
| 9,459,366 B2 | 10/2016 | Henman et al. |
| 9,494,700 B2 | 11/2016 | Henman et al. |
| 9,523,780 B2 | 12/2016 | Naes et al. |
| 9,541,663 B2 | 1/2017 | Rokkan et al. |
| 9,846,250 B2 | 12/2017 | Rokkan et al. |
| 2001/0028041 A1 | 10/2001 | Hubbard |
| 2002/0110048 A1 | 8/2002 | Vandenbroucke |
| 2002/0152031 A1 | 10/2002 | Jones |
| 2003/0099155 A1 | 5/2003 | Dominguez et al. |
| 2003/0117893 A1 | 6/2003 | Bary |
| 2003/0123325 A1 | 7/2003 | Nemeth |
| 2003/0159877 A1 | 8/2003 | Martin et al. |
| 2003/0218936 A1 | 11/2003 | Chamberlain |
| 2003/0218937 A1 | 11/2003 | Berg et al. |
| 2004/0026346 A1 | 2/2004 | Kelly et al. |
| 2004/0065443 A1 | 4/2004 | Berg et al. |
| 2004/0073373 A1 | 4/2004 | Wilson |
| 2004/0150188 A1 | 8/2004 | Smith |
| 2004/0173992 A1 | 9/2004 | Stunder et al. |
| 2004/0196737 A1 | 10/2004 | Nicholson |
| 2004/0262124 A1 | 12/2004 | Muchalov |
| 2005/0090987 A1 | 4/2005 | Amundsen et al. |
| 2005/0098377 A1 | 5/2005 | Bary et al. |
| 2005/0099888 A1 | 5/2005 | Martin et al. |
| 2005/0105391 A1 | 5/2005 | Berg |
| 2005/0155814 A1 | 7/2005 | Bath et al. |
| 2005/0204991 A1 | 9/2005 | Robichaud et al. |
| 2005/0235898 A1 | 10/2005 | Hobson et al. |
| 2005/0246137 A1 | 11/2005 | Brinkman et al. |
| 2005/0276665 A1 | 12/2005 | Entralgo et al. |
| 2006/0120216 A1 | 6/2006 | Ray et al. |
| 2006/0159524 A1 | 7/2006 | Thompson et al. |
| 2006/0201243 A1 | 9/2006 | Auffret et al. |
| 2007/0070808 A1 | 3/2007 | Ray et al. |
| 2013/0083622 A1 | 4/2013 | Herrmann et al. |
| 2013/0215714 A1 | 8/2013 | Meunier |
| 2014/0251199 A1 | 9/2014 | Brizard |
| 2014/0301161 A1 | 10/2014 | Brizard et al. |
| 2015/0003194 A1 | 1/2015 | Brizard |
| 2015/0316675 A1 | 11/2015 | Brizard et al. |
| 2015/0336645 A1 | 11/2015 | Brizard et al. |
| 2015/0336646 A1 | 11/2015 | Brizard et al. |
| 2015/0338433 A1 | 11/2015 | Valsvik et al. |
| 2015/0362606 A1 | 12/2015 | Henman et al. |
| 2016/0028238 A1 | 1/2016 | Isfeldt |
| 2016/0041280 A1 | 2/2016 | Naes et al. |
| 2016/0041284 A1 | 2/2016 | Rokkan et al. |
| 2016/0041285 A1 | 2/2016 | Rokkan et al. |
| 2016/0046358 A1 | 2/2016 | Lelaurin et al. |
| 2016/0056645 A1 | 2/2016 | Henman et al. |
| 2016/0094298 A1 | 3/2016 | Isfeldt et al. |
| 2016/0121983 A1 | 5/2016 | Rokkan et al. |
| 2016/0124105 A1 | 5/2016 | Valsvik et al. |
| 2016/0245945 A1 | 8/2016 | Rokkan et al. |
| 2016/0280345 A1 | 9/2016 | Brizard |
| 2016/0341840 A1 | 11/2016 | Rokkan et al. |
| 2016/0349386 A1 | 12/2016 | Naes |
| 2016/0349387 A1 | 12/2016 | Rokkan et al. |
| 2016/0363678 A1 | 12/2016 | Maxwell |
| 2016/0377757 A1 | 12/2016 | Henman et al. |
| 2017/0017003 A1 | 1/2017 | Naes et al. |
| 2017/0017008 A1 | 1/2017 | Henman et al. |
| 2017/0031046 A1 | 2/2017 | Rokkan et al. |

FOREIGN PATENT DOCUMENTS

| | | |
|---|---|---|
| WO | WO-03/005062 | 1/2003 |
| WO | WO-2004/031807 | 4/2004 |
| WO | WO-2005/074405 A2 | 8/2005 |

OTHER PUBLICATIONS

Extended European Search Report for EP 06718632.0 dated Jun. 8, 2010 (9 pages).

Final Office Action for U.S. Appl. No. 13/195,198 dated May 23, 2013 (5 pages).

Final Office Action for U.S. Appl. No. 13/195,198 dated Jun. 11, 2012 (10 pages).

Final Office Action for U.S. Appl. No. 14/158,601 dated Jun. 21, 2017 (11 pages).

Final Office Action for U.S. Appl. No. 14/158,601 dated Feb. 25, 2019 (12 pages).

Final Office Action for U.S. Appl. No. 14/158,604 dated Jan. 22, 2016 (10 pages).

Final Office Action for U.S. Appl. No. 14/158,601 dated May 23, 2016 (9 pages).

International Preliminary Examination Report for PCT/US2006/01581 dated Sep. 23, 2008 (11 pages).

International Search Report for PCT/US2006/01581 dated Sep. 5, 2008 (1 page).

Non-Final Office Action for U.S. Appl. No. 14/158,601 dated Jul. 30, 2015 (10 pages).

Non-Final Office Action for U.S. Appl. No. 13/195,198 dated Dec. 12, 2012 (12 pages).

Non-Final Office Action for U.S. Appl. No. 14/158,601 dated Aug. 24, 2018 (12 pages).

Non-Final Office Action for U.S. Appl. No. 14/158,601 dated Jan. 6, 2016 (9 pages).

Non-Final Office Action for U.S. Appl. No. 14/158,604 dated Apr. 22, 2016 (17 pages).

Non-Final Office Action for U.S. Appl. No. 14/158,604 dated Jul. 30, 2015 (10 pages).

Non-Final Office Action for U.S. Appl. No. 15/481,149 dated Sep. 12, 2018 (9 pages).

Non-Final Office Action for U.S. Appl. No. 14/158,601 dated Dec. 8, 2016 (8 pages).

Notice of Allowance for U.S. Appl. No. 13/195,198 dated Sep. 26, 2013 (6 pages).

Notice of Allowance for U.S. Appl. No. 14/158,601 dated Nov. 6, 2019 (8 pages).

Notice of Allowance for U.S. Appl. No. 15/481,149 dated Aug. 12, 2019 (5 pages).

Notice of Allowance for U.S. Appl. No. 15/481,149 dated Mar. 27, 2019 (5 pages).

Notice of Allowance for U.S. Appl. No. 15/638,348 dated Nov. 8, 2019 (9 pages).

Notice of Allowance for U.S. Appl. No. 14/158,604 dated Jan. 18, 2017 (6 pages).

Parker, Sybil P., Editor in Chief, "McGraw-Hill Dictionary of Scientific and Technical Terms", McGraw-Hill Book Company, Jan. 2000 (2 pages).

* cited by examiner

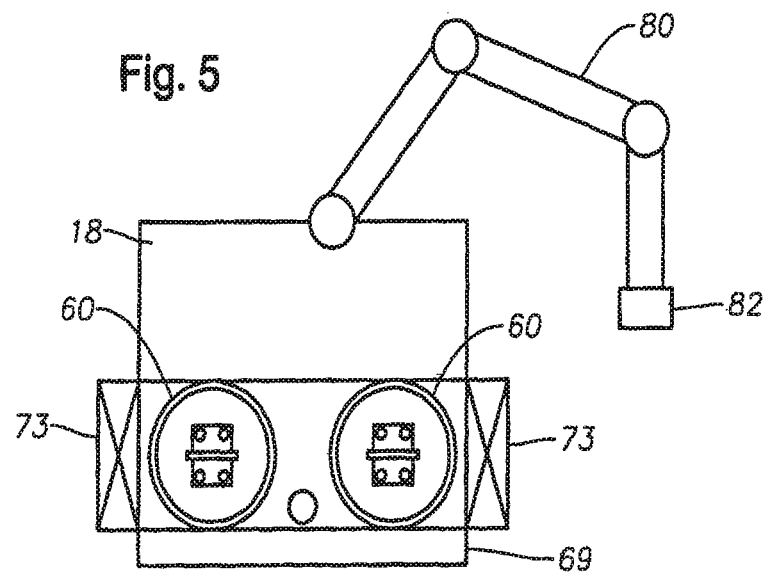
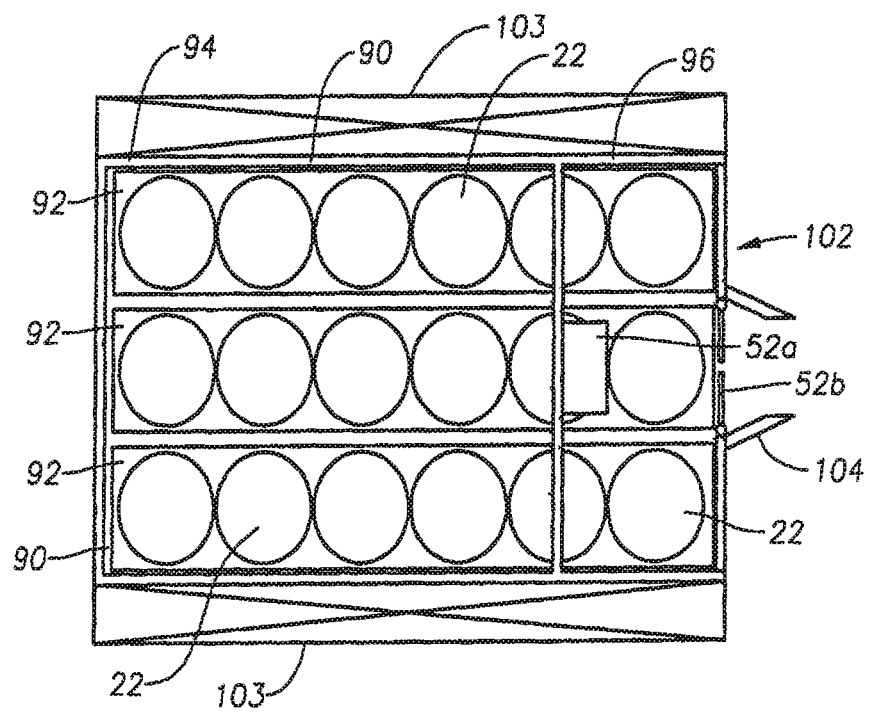

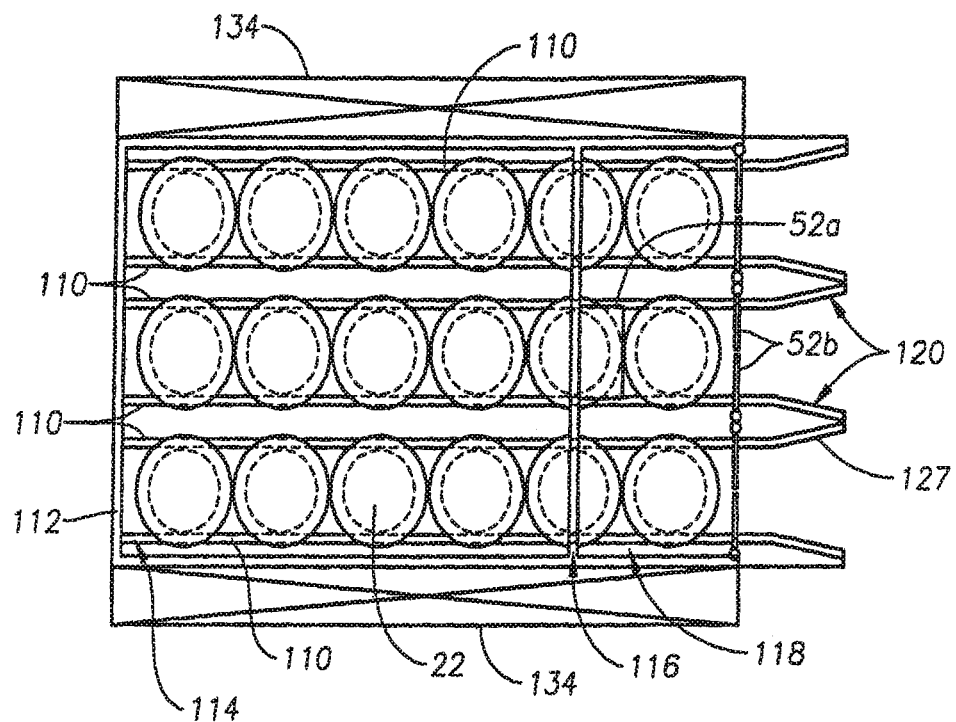
Fig. 9
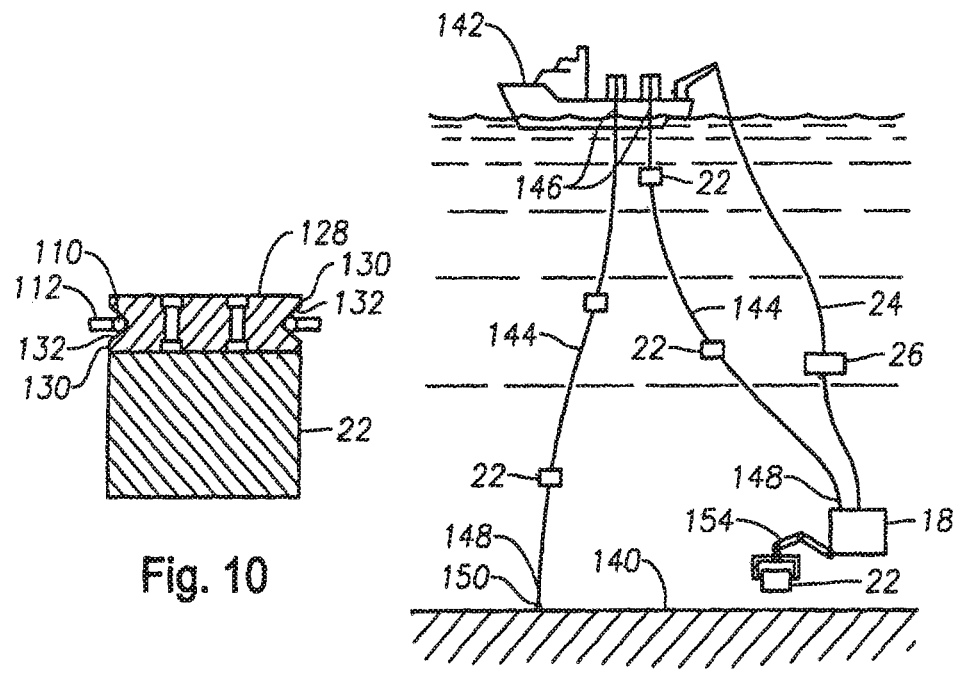
Fig. 10
Fig. 11

METHOD AND SYSTEM FOR DEPLOYMENT OF OCEAN BOTTOM SEISMOMETERS

CROSS-REFERENCES TO RELATED APPLICATIONS

This application claims the benefit of priority under 35 U.S.C. § 120 as a continuation of U.S. patent application Ser. No. 14/158,601, filed Jan. 17, 2014, which claims the benefit of priority under 35 U.S.C. § 120 of U.S. patent application Ser. No. 13/195,198, filed Aug. 1, 2011, which claims the benefit of priority under 35 U.S.C. § 120 of U.S. patent application Ser. No. 11/711,353, filed Feb. 27, 2007, which claims the benefit of priority under 35 U.S.C. § 120 of U.S. patent application Ser. No. 11/037,031, filed Jan. 17, 2005, each of which are incorporated by reference herein in their entirety.

BACKGROUND

The present invention relates to the field of seismic exploration. More particularly, the invention relates to a method and apparatus for seismic exploration, and most particularly to deployment and retrieval of ocean bottom seismometer systems in deep marine environments.

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals (known as "seismic reflections") are detected and recorded by seismic receiver units positioned at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic receiver units are arranged in an array, wherein the array of seismic receivers consists of a single string of receivers distributed along a line in order to record data from the seismic cross-section below the line of receivers. For data over a larger area and for three-dimensional representations of a formation, multiple strings of receivers may be distributed side-by-side, such that a grid of receivers is formed.

While the fundamental process for detection and recording of seismic reflections is the same on land and in marine environments, marine environments present unique problems due to the body of water overlaying the earth's surface. In marine environments, even simple deployment and retrieval of seismic receiver units is complicated since operations must be conducted off the deck of a seismic exploration vessel, where external elements such as wave action, weather and limited space can greatly effect the operation. These factors have become even more significant as exploration operations have pushed to deeper and deeper water in recent years.

Exploration in deep water has resulted in an increased reliance on seismic receiver units that are placed on or near the seabed. These devices are typically referred to as "OBC" (Ocean Bottom Cabling) or "OBS" (Ocean Bottom Seismometer) systems. There are three main groups of ocean bottom apparatus generally used to measure seismic signals at the seafloor. The first type of apparatus is an OBC system, similar to the traditional towed streamer, which consists of a wire or fiber cable that contains geophones and/or hydrophones and which is laid on the seabed, where the detector units are interconnected with cable telemetry. For OBC systems, a seismic vessel will deploy the cable off the bow or stern of the vessel and retrieve the cable at the opposite end of the vessel. In most cases, three ships are required to conduct the overall operation since, in addition to a seismic energy source vessel, a specially equipped vessel is necessary for cable deployment and a separate vessel is needed for recording. The recording vessel is usually stationary and attached to the cable, while the deployment vessel is generally in constant motion along the receiver line deploying and retrieving cable. Because the recording vessel is in constant physical contact with the cable, the effort required to maintain the vessel's position to counter wave action and ocean currents can generate great tension within the cable, increasing the likelihood of a broken cable or failed equipment, as well as the introduction of signal interference into the cable.

A second type of recording system is an OBS system in which a sensor package and electronics package is anchored to the sea floor. The device typically digitizes the signals and uses a wire cable to transmit data to a radio unit attached to the anchored cable and floating on the water surface. The floating transmitter unit then transmits the data to a surface vessel where the seismic data are recorded. Hundreds if not thousands of OBS units are typically deployed in a seismic survey. A third type of seismic recording device is an OBS system known as Seafloor Seismic Recorders (SSR's). These devices contain the sensors and electronics in sealed packages, and record seismic data on-board while deployed on the seafloor (as opposed to digitizing and transmitting the data to an external recorder). Data are retrieved by retrieving the device from the seafloor. SSRs are typically re-usable.

Each OBS system generally includes components such as one or more geophone and/or hydrophone sensors, a power source, a crystal oscillator clock, a control circuit, and, in instances when gimbaled geophones are used and shear data are recorded, a compass or gimbal. Many of these components are subject to various effects arising from the orientation of the OBS unit as it is deployed on the ocean bottom. For example, crystals are subject to gravitational effects, such that orientation of the OBS system can effect operation of a crystal clock. Any misorientation of the OBS system on the seabed can result in clock inaccuracies. Likewise, while mechanical gimbals may be used to correct for tilt, pitch in many mechanical gimbal devices is limited 30°. For such devices, in order for the gimbal to function properly, the OBS system must be deployed on the seabed in substantially the desired orientation, i.e., approximately 30° from the horizontal or less. Of course, it is well known that mechanical gimballing of a geophone is expensive and requires more space than a non-gimballed geophone, and as such, it is desirable to deploy an OBS system so as to render gimballing unnecessary.

As with orientation, the location of OBS system on the seabed is necessary to properly interpret seismic data recorded by the system. The accuracy of the processed data depends in part on the accuracy of the location information used to process the data. Since conventional location devices such as GPS will not operate in the water environments, traditional prior art methods for establishing the location of the OBS systems on the seabed include sonar. For example, with a sonar system, the OBS device may be "pinged" to determine its location. In any event, the accuracy of the processed data is directly dependent on the precision with which the location of the OBS system is determined. Thus, it is highly desirable to utilize deployment methods and devices that will produce dependable location information. In this same vein, it is highly desirable to ensure that the planned positioning of the OBS device on the seabed is achieved.

One problem that is common in all types of seismic systems physically deployed on the seabed is the degree of coupling between the system and the seabed. Those skilled in the art will understand that the physical coupling between a seismic unit and the earth has become one of the primary concerns in the seismic data collection industry. Effective coupling between the geophones of a system and the seabed is paramount to ensuring proper operation of the system. For example, in an OBC system where three-dimensional geophones are employed, because the cable is simply laid on the seabed, geophones are not rigidly coupled to the sediment on the seabed. As such, horizontal motion other than that due to the sediment, such as for example, ocean bottom currents, can cause erroneous signals. Likewise, because of its elongated structure, OBC systems tend to have satisfactory coupling only along the major axis of the cable when attempting to record shear wave data.

To enhance coupling, many OBS systems of the prior art separate sensing units, i.e., the geophone package, from the remainder of the electronics to ensure that the geophones are effectively coupled to the seabed.

Thus, orientation, positioning and coupling of an OBS unit are all important factors in achieving effective operation of a seismic unit and collection of seismic data. Each of these placement components is highly dependent on the manner in which the OBS units are deployed. Typically, for operations in coastal transition zones such as shallow water or marshes, units are simply dropped in a water column over the side of a deployment vessel above the targeted seabed position. Because the water column is comparatively shallow and the OBS unit is relatively heavy, the effects of ocean currents, drag and the like is minimal and the desired positioning of the OBS unit on the seafloor can be fairly easily achieved. In contrast, an OBS unit dropped through hundreds or thousands of feet of water and subject to the forces of buoyancy, drag and ocean currents could settle on the seabed as much as several hundred feet from its original position. Not only is the unit likely to be of little value in the seismic survey because of its misplacement, locating and retrieving the OBS unit becomes much more difficult.

Of course, orientation is often less certain than positioning. Various objects, whether rocks, reefs or even discarded debris, can disrupt the desired orientation of a unit, which in most cases is preferably parallel with the horizontal. Those skilled in the art will understand that orientation can effect data accuracy. The most accurate data is data that has been processed to account for the orientation of the seismic collection unit that acquires the raw data. Such processing typically necessitates additional equipment on-board the unit itself to determine x, y and z orientation, as well as additional computational power and time during processing of the raw data.

Likewise, the degree of coupling between a seismic collection unit and the sea floor, whether in shallow water or deep water, is often difficult to determine at the time a unit is positioned. This is particularly true of seismic units that are simply allowed to settle where they land. In many cases, the top layer of silt at a particular location on the sea floor may be somewhat unstable or mushy, such that seismic energy transmission therethrough to the seismic unit is attenuated or distorted in some way. Even in the case of relatively hard or compact sea floors, if a seismic unit has not formed a good coupling with the earth, seismic energy passing from the earth to the unit's geophones may be attenuated. Thus, even if a unit is positioned in the desired location and oriented to minimize gravitational effects and the like on seismic data, a high degree of coupling must still be achieved in order to maximize the quality of the collected data.

Thus, based on the foregoing, it is highly desirable to be able to place OBS units on the sea floor of deep water locations so as to ensure the desired positioning and orientation is achieved and to maximize coupling between the unit and the sea floor.

Because the push to conduct seismic operations in deep water is relatively recent, few attempts have been made to address the above-mentioned problems associated with deep water deployment of OBS units. U.S. Patent Application Publication US 2003/0218937 A1 discloses a method for OBS deployment utilizing a tethered remote operating vehicle ("ROV") and a separate OBS carrier cage, each lowered to the seabed on a separate line. The carrier contains a plurality of OBS units. The reference teaches that once the ROV and carrier cage are positioned adjacent the seabed, the ROV can be used to extract and place each OBS unit in the desired location around the carrier. In a preferred embodiment, a plurality of carriers are used to simultaneously lower a large group of OBS units close to the seabed at one time so as to maximize the operational time of the ROV.

Those skilled in the art will understand that such a system will likely encounter operational problems in light of the rigors of deep water operations where extreme depths, surface conditions, multiple ocean currents and mushy or unstable sea bottom conditions can all significantly affect the deployment effort Most notably, the drag on the carrier, the ROV and their respective lines are all different, and as such, these different components of the deployment system will have disparate responses under water when subject to the various elements. In the case of the carrier cage, there is no mechanism for remotely controlling the position of the cage in the water, the result being that the cage is highly likely to be pulled along in the direction of the prevailing ocean currents with very little control over the cage's movement. In this same vein, the tether for the ROV and the line for the carrier cage are likely to be of different dimensions and buoyancies such that drag on the lines is likely to differ substantially. When deployed in thousands of feet of water, the effects of drag on these various elements of the prior art system are significantly magnified, such that the ROV and the carrier cage could be hundreds of feet or more apart.

Perhaps even more threatening to such a system under actual operating conditions is the likelihood that the lines will become tangled, interrupting a seismic shoot and threatening profitability. Those skilled in the art understand that as the number of lines in the water at any given time increases, the more complicated the operation becomes and the more difficult it becomes to control movement of the lines and prevent tangling. This is particularly true where the lines, as well as the objects attached at the lower ends of the lines, have different drag characteristics. Even when the end of one line is controlled by an ROV, but the other is not, entanglement is likely. As an example, each line may be as long as 10,000 feet extending from the surface of the water to the seabed. Since a typical deployment boat may be only 40 feet wide and each line is deployed on opposite sides of the boat, there is a high probability that the carrier cage line will become entangled with the ROV tether.

An additional drawback to the above-described prior art system is that it utilizes only a single ROV for deployment and retrieval. While such a system minimizes the cost of operations, the entire operation is dependent on the operability of the single ROV. Any breakdown of the ROV can substantially delay the deployment/retrieval efforts since repairs would be necessary before continuing.

Thus, it would be desirable to provide a deployment system for deep water seismic data collection units that minimizes the effects of drag, weather, ocean currents, depth and similar conditions on OBS deployment operations at or near the seabed. Additionally, such a system preferably would be disposed to retrieve previously deployed OBS units. Such a system should permit accurate placement and orientation on the seabed and good coupling of individual OBS units therewith. Preferably, such a system would utilize an ROV to deploy and/or retrieve multiple OBS units at or near the seabed in a manner that maximizes use of the ROV in the operations. The system should provide minimum likelihood of entanglement of lines if more than one line is used in the same operation. The system should also provide for efficient turn-around of OBS units that have been retrieved from deployment. Such turnaround would desirably include data extraction and recharging of the OBS units. In the preferred embodiment, the deployment system would also minimize the effects of equipment breakdown on the overall seismic acquisition operation.

OBS units deployment should be easily accomplished, yet the OBS units should be deployable at a certain location with a high degree of confidence.

The system should also be capable of readily handling the hundreds or thousands of OBS units that comprise an array for deployment in ocean environments. Such a system should be able to deploy, retrieve, track, maintain and store individual recorder units while minimizing manpower and the need for additional surface vessels. The system should likewise minimize potential damage to the individual units during such activity.

SUMMARY OF THE INVENTION

The present invention provides a system for deep water deployment and retrieval of QBS units from a surface vessel or platform. The system utilizes at least one remotely operated vehicle ("ROV") or similar device to which is attached a carrier apparatus in which is seated multiple, independently deployable OBS units. In most of the preferred embodiments, the carrier apparatus is attached directly to the ROV. As such, the ROV itself is used to carry the OBS units down to the seabed from the surface vessel. Once adjacent the seabed, the ROV can efficiently move between desired "node" locations in order to plant an OBS for operation. Preferably, the individual units can either be automatically ejected from the carrier apparatus or alternatively extracted and placed with the assistance of a robotic arm or similar manipulation device carried on the ROV/carrier system.

In one preferred embodiment, the carrier apparatus consists of a moving or rotating carousel on which the OBS units are carried. The carousel rotates in order to position an OBS unit for deployment from the carrier. Such deployment may be automatic or require external assistance, such as a robotic arm located on the carrier or ROV. A carousel such as this is desirable because it not only simplifies deployment from the carrier, but it also permits the carrier "load", i.e., the OBS units, to be shifted in order to control weight balance and buoyancy of the ROV/carrier system.

In another preferred embodiment, the carrier apparatus is a barrel into which is loaded multiple OBS units. The barrel is attached to the ROV so that the OBS units can be discharged from an end of the barrel, again either automatically or with external assistance. The barrel may also be utilized to retrieve OBS units from deployment on the seabed.

In yet another preferred embodiment, the carrier is provided with one or more movable conveyor belts. OBS units are disposed on the conveyor belts which are operable to move the OBS units to a discharge position on the carrier. As with the carousel mentioned above, the conveyor belt(s) can be utilized to shift OBS units within the carrier so as to control weight balance and buoyancy. The conveyor belt(s) may also be utilized to retrieve the OBS units from deployment on the seabed.

In still another preferred embodiment, the OBS units are carried on rails that form a part of the carrier apparatus. The OBS units are disposed to slidingly move along the rails in order to move them to a deployment position on the carrier. The rails may also be utilized to engage the OBS units for retrieval from the seabed.

In another preferred embodiment, OBS units are sequentially delivered to the seabed utilizing an "on time" delivery system so that an OBS unit arrives for deployment just as the ROV is moving into position for placement of the unit. In this preferred embodiment, each OBS unit is transported down a delivery line that runs substantially parallel with the ROV's tether. The delivery line is attached to the ROV so as to move in conjunction with the ROV. Alternatively, the delivery line may form a part of the ROV tether itself. In either case, the delivery line is disposed to deliver OBS units adjacent an ROV robotic arm or similar device so as to permit the OBS unit to be removed from the delivery line and positioned by the ROV for operation. Because of the relatively long travel time necessary for an OBS unit to travel down a delivery line from a deployment vessel to an ROV, multiple OBS units may be traveling down the delivery line simultaneously, albeit spaced apart accordingly, to permit the ROV to deploy an OBS unit prior to the arrival of the next OBS unit.

In another embodiment of the "on time" delivery system, the OBS units are sequentially delivered to the seabed by utilizing a deployment and retrieval line having the units attached thereto at intervals compatible with the desired placement spacing. At the ocean surface, a marine vessel pays out the deployment line with the attached units, while at or near the seabed a guide disposed on an ROV engages the line and moves along a desired layout line. Movement of the ROV along the layout line causes the deployment line to be drawn through the water column and pass through the guide. As an OBS unit passes through the guide, the unit is placed or "planted" on the seabed by the ROV. After a unit is placed, the ROV continues to move along the desired line layout, thereby causing the next OBS unit attached to the deployment line to be drawn through the guides. Preferably, the ROV arrives at the next desired OBS unit deployment location just as the next OBS unit on the deployment line is arriving at the seabed. This process continues until all OBS units for a desired line layout have been deployed.

In the preceding embodiment of the invention, an anchor weight may be attached to the deployment line a distance from the final OBS unit that has been placed for the layout. The anchor unit is placed on the seabed by the ROV so as to maintain a desired slack between the final unit and the anchor. Preferably, a buoy is attached to the anchor with a buoy line while an acoustical release device attached to the buoy line causes the buoy to "float" a distance below the surface of the water. Upon activation of the release device, the buoy will float to the surface so as to permit the deployment line with attached OBS units to be retrieved.

In each case, by utilizing an ROV or similar remote deployment mechanism, OBS units can be placed accurately on the seabed in the desired position. Likewise, proper orientation can be ensured, as can a high degree of coupling. In the preferred embodiment, each OBS unit is wireless and self-contained so that no communication or control is required between the ROV and the OBS units. In this embodiment, operation of the OBS units is initiated prior to deployment from the deck of the deployment vessel, or alternatively, prior to handling by the ROV at the seabed. In another embodiment, the OBS unit and the ROV are each equipped with a wireless communication device, such as an acoustic or electromagnetic modem, so that the ROV can be utilized to communicate with the OBS unit when the unit and the ROV are in "wireless" range of one another. This permits communication with the OBS unit for purposes such as activation, operation and quality control.

The ROV/carrier system can also be utilized to retrieve deployed OBS units from the seabed and transport them back to the surface vessel. A carrier containing retrieved OBS units can be detached from the ROV at the surface and moved to a location on the vessel for processing and servicing of the OBS units. Preferably, such units are removed from the carrier and seismic data extraction takes place on the deck. Thereafter, the OBS units are charged, tested, re-synchronized, and OBS unit operation is re-initiated. OBS units that have been processed in this regard can be loaded back into the carrier for reuse.

Preferably, each OBS unit is self contained such that all of the electronics are disposed within the OBS unit's case, including a multi-directional geophone package, a seismic data recording device, a power source and a clock. A wireless communication device also may be included for communication between the ROV and OBS. The power source is preferably rechargeable batteries.

Preferably, each OBS unit is activated while on-board the seismic vessel and deactivated once retrieved from the ocean, such that the unit is continuously acquiring data during a time period beginning before the ROV begins a trip down to the seabed. Alternatively, to the extent a wireless communication device is present on the ROV and in the OBS units, recording is initiated through the ROV communication link at or near the time the OBS unit is deployed by the ROV.

A robotic arm, overhead gantry, crane or the like may be positioned on the deck to move carriers and ROVs. Likewise, the vessel would include an OBS unit handling system to load and unload carriers, as well as to perform various tasks on the OBS units, such as data extraction, testing and charging.

DETAILED DESCRIPTION

FIG. 5 illustrates one embodiment of the barrel type carrier attached to an ROV.

FIG. 6 is a top view of a carrier system employing conveyor belts to manipulate OBS units.

FIG. 9 is a cut-away top view of the carrier of FIG. 8.

FIG. 10 is an end view of an OBS unit deployed on the rails of the carrier of FIG. 8.

FIG. 11 is a schematic view of seismic operations in deep waters showing deployment of OBS receiver units using an ROV and one embodiment of the "on time" delivery system that is the subject of the present invention.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
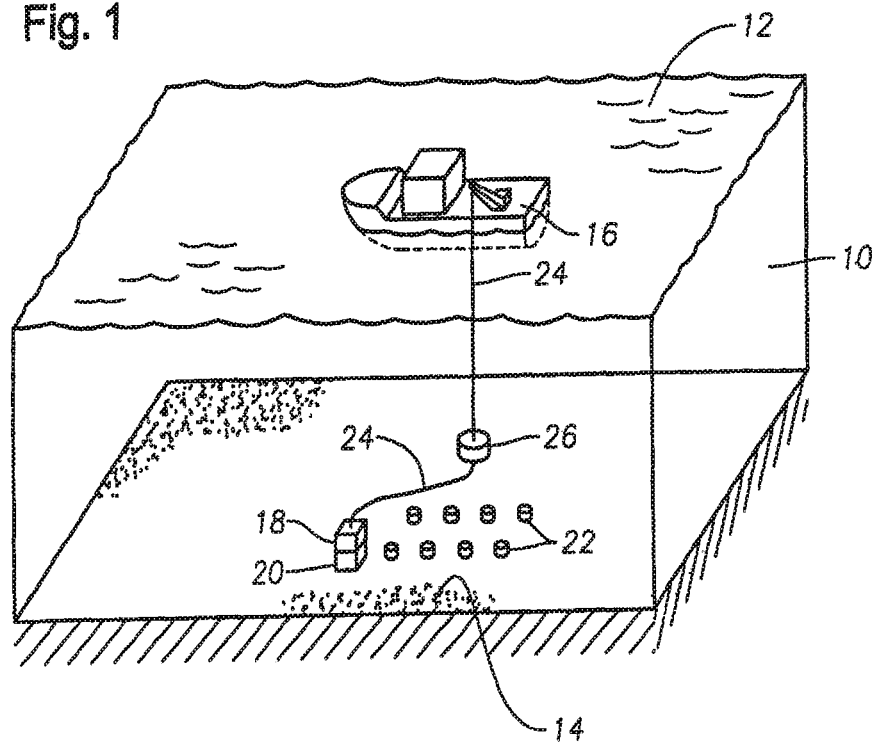
FIG. 1 is a schematic view of seismic operations in deep waters showing deployment of autonomous OBS receiver units using the ROV/carrier system that is the subject of the present invention.

With reference to FIG. 1, there is shown a body of water 10 having a surface 12 and a seabed 14. A vessel or operations platform 16 is positioned on the surface 12 of the water 10. A remotely operated vehicle ("ROV") or similar device 18 is in communication with vessel 16. A carrier 20 is attached to ROV 18. Carrier 20 is disposed for receipt of a plurality of ocean bottom seismic receiver units 22. ROV 18 is capable of moving between surface 12 and seabed 14 in order to ferry ocean bottom seismic receiver units 22 therebetween. ROV 18 may also be utilized to remove units 22 from carrier 20 and place units 22 on seabed 14. Likewise, ROV 18 may be utilized to retrieve units 22 from seabed 14 and insert units 22 into an empty or partially empty carrier 20. Alternatively, carrier 20 may be disposed to eject or otherwise cause to be removed units 22 therefrom for deployment on seabed 14.

ROV 18 and seismic operations related to units 22 are preferably conducted off of the same vessel or platform, in the illustrated case, vessel 16. While any type of underwater vehicle can be utilized for such operations, including without limitation, a submarine or an autonomous underwater vehicle (AUV), ROVs as are commonly utilized for all types of underwater operations are contemplated in the preferred embodiment. Such ROVs are typically in communication with the surface vessel or platform 16 via an umbilical cord or tether 24, which is used to provide power, communications and control. Commonly, a tether management system or "TMS" 26 may be utilized as an intermediary, sub surface platform from which to operate an ROV. A TMS is typically also a controllable platform disposed to carry and pay out a long length of tether 24, such as for example 1600 meters. For most ROV 18 operations at seabed 14, TMS 26 can be positioned approximately 50 feet above seabed 14 and can pay out tether 24 as necessary for ROV 18 to move freely about at seabed 14 in order to "plant" OBS units 22 thereon.

Figure 2:
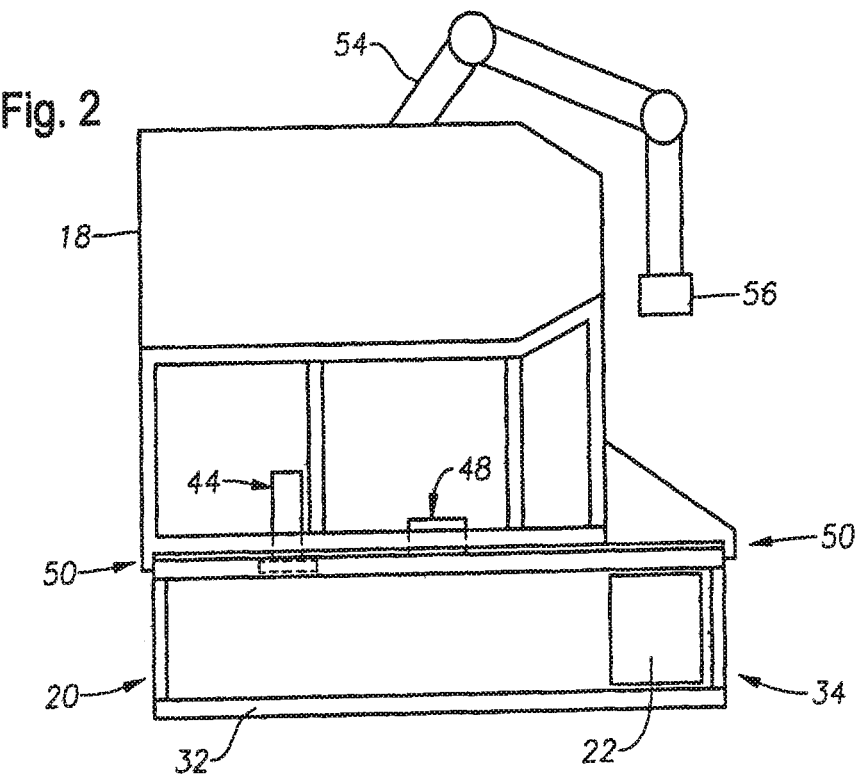
FIG. 2 is perspective view of carrier system employing a moving carrousel to manipulate OBS units.
Figure 3:
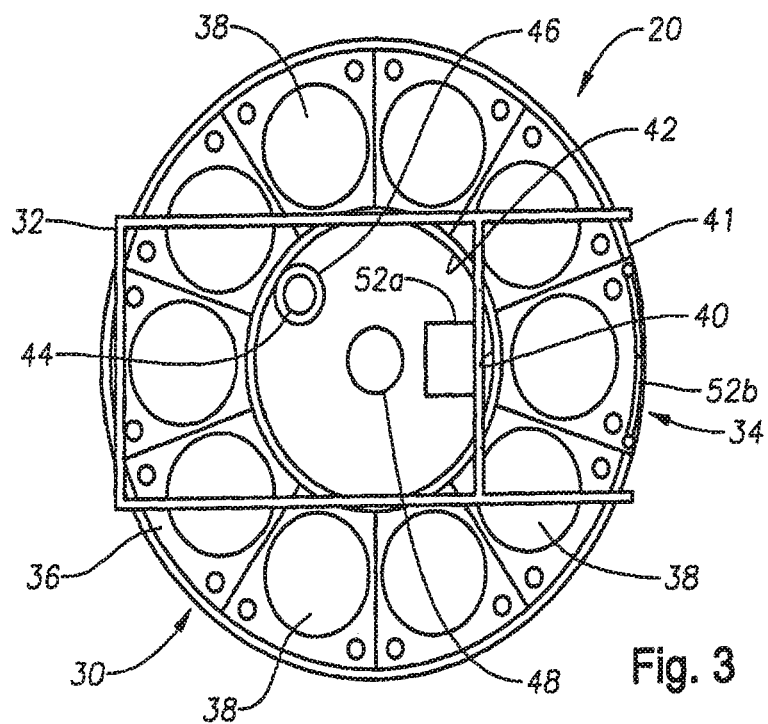
FIG. 3 is a cut-away top view of a carrousel type carrier system of FIG. 2.

Turning to FIGS. 2 and 3, there is shown an ROV 18 attached to a carrier system 20 employing a moving carrousel 30 on which are seated a plurality of OBS units 22. Carrier system 20 is defined by a frame 32 in which carrousel 30 is mounted and on which a discharge port 34 is defined. Carousel 30 is comprised of circular pod guide 36 on which are mounted a plurality of seats 38 in which units 22 can be seated. In one embodiment, pod guide 36 is a rigid wheel. In an alternative embodiment, pod guide 36 is a movable track. In any event, wheel/track 36 is defined by an inner perimeter 40 and an outer perimeter 41. Disposed along said inner perimeter 40 are gear teeth 42. A drive motor 44 having a drive gear 46 is positioned adjacent inner perimeter 38 so that drive gear 46 of motor 44 can engage gear teeth 42 of wheel/track 36. Carrier system 20 is attached to ROV 18 via center shaft 48.

In one preferred embodiment, carrier system 20 is pivotally attached to center shaft 48 while drive motor 44 is rigidly fixed to ROV 18 so that activation of drive motor 44 causes the entire carrier system 20 to rotate on shaft 48 relative to ROV 18. In this configuration, an additional drive motor may be provided to rotate frame 32 relative to carousel 30. In such case, frame 32 and carousel 30 may be separately pivotally mounted on center shaft 48. Rotation of carousel 30 relative to frame 32 permits individual seats 38 to be selectively positioned adjacent discharge port 34.

In another embodiment frame 32 is rigidly attached to ROV 18 and only carousel 30 is pivotally attached to center shaft 48. Drive motor 44 is rigidly attached to either ROV 18 or frame 32 so that activation of drive motor 44 causes carousel 30 to rotate within frame 32 so as to move individual seats 38 adjacent discharge port 34.

Frame 32 is also provided with guides 50 that maintain the alignment of carousel 30 within frame 32.

A variety of discharge mechanisms may be used to cause an OBS unit 22 to be deployed from carrier 20 via discharge port 34. In one embodiment, frame 32 includes a spring mechanism 52*a* adjacent port 34 wherein spring mechanism 52 urges unit 22 through port 34. In another embodiment, frame 32 may include a pivotal release lever or door 52*b* that blocks discharge port 34. Door 52*b* can be selectively activated to open, thereby permitting a unit 22 seated adjacent discharge port 34 to be deployed therethrough.

Commonly ROVs such as ROV 18 are provided with at least one robotic arm, such as is indicated at 54. Robotic arm 54 may be used in the alternative to the above described discharge mechanisms or in concert therewith. Furthermore, carrier 20 may be provided with its own robotic arm. In any event, robotic arm 54 includes a clamping mechanism 56 that can engage a unit 22 and extract said unit from discharge port 34.

Those skilled in the art will understand that upon discharge of a unit 22 from carrier 20, the weight, balance and buoyancy of the ROV/carrier system is changed. By utilizing a movable carousel 30 as described above, the carrier load, i.e., the remaining OBS units 22, can be rotated to re-adjust weight distribution and ensure desired balance of the system. In this regard, it is desirable to launch OBS units 22 in an alternating fashion relative to their position on carousel 30 so as to maintain a substantially uniform balance for the overall system. For example, carousel 30 is rotated so as to cause units approximately 175°-185° apart on wheel 36 to be sequentially launched.

Figure 4:
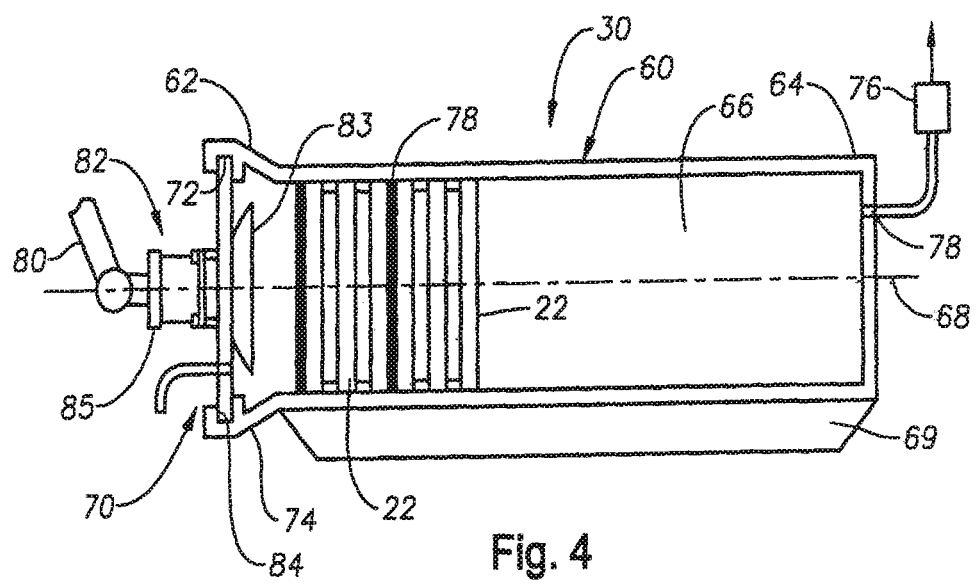
FIG. 4 is a perspective view of the carrier system employing a barrel to contain OBS units.

FIGS. 4 and 5 illustrate another preferred embodiment of the invention in which carrier 20 is comprised of a barrel 60 into which is loaded multiple OBS units 22. Barrel 60 has a first end 62, a second end 64 with a chamber 66 therebetween and is defined along a central axis 68. Barrel 60 is mounted on a frame 69 and disposed to receive multiple OBS units 22 axially stacked within chamber 66 along central axis 68. At first end 62, barrel 60 is provided with a discharge port 70 through which units 22 can be discharged from chamber 66. Discharge port 70 may include a locking ring 72 disposed around a flared portion 74 of the inner perimeter of first end 62 of barrel 60. Buoyancy material 73 may be attached to carrier 20.

A pump 76 is in fluid communication with inner chamber 66, preferably through a port 78 provided adjacent the second end 64 of chamber 66, and is utilized to pump sea water into chamber 66 as units 22 are discharged therefrom. Those skilled in the art will appreciate that when units 22 are disposed within barrel 60, each unit snuggly fits within the perimeter of barrel 60 thereby permitting pump 76 to build up a head of pressure within chamber 66 so as to urge units 22 axially towards discharge port 70. Additionally, water pumped into chamber 66 by pump 76 can be utilized to control the buoyancy of carrier 20. In this regard, disks 78 formed of a buoyant material may be sandwiched between adjacent OBS units 22 to add further buoyancy to carrier 20.

In the preferred embodiment, a robotic arm 80 of ROV 18 is utilized to discharge units 22 from barrel 60. In this embodiment, robotic arm 80 includes a clamping mechanism 82 that engages the unit 22 seated in discharge port 70. Clamping mechanism 82 may be comprised, in one illustrative and non-limiting instance, of a suction cup 83 that can engage unit 22. Clamping mechanism 82 may further include a locking flange 84 that seats within locking ring 72 during extraction of an OBS unit 22. Once the clamping mechanism is secured in locking ring 72, the pressure head from barrel 60 can be utilized to urge an OBS unit 22 into engagement with clamping mechanism 82, at which point clamping mechanism 82 is detached from discharge port 70 so as to withdraw unit 22 therefrom. Alternatively, clamping mechanism 82 may further comprise a biased plunger mechanism 85 attached to locking flange 84 and disposed to axially move suction cup 83 into engagement with unit 22 once locking flange 84 is seated in locking ring 72.

In another embodiment, units 22 can be automatically discharged from discharge port 70 under the pressure head from barrel 60. In this embodiment, a unit 22 seats in flange 72. Once a predetermined pressure is achieved within barrel 60, flange 72 releases the unit and the next sequential unit seats in flange 72. Such a configuration permits the carrier 20, and specifically discharge port 70, to be positioned adjacent seabed 14 at the desired location for "planting" an OBS unit 22 thereon. As such, units 22 that are released from flange 72 drop into place on seabed 14 without the need for further manipulation.

An alternative embodiment utilizes an additional discharge mechanism, such as a spring or similar biasing element, positioned within barrel 60 to urge units 22 axially along barrel 60 and out through discharge port 70.

While the barrel-type carrier 20 has been described with a single barrel, those skilled in the art will appreciate that such a configuration will work equally well with multiple barrels aligned in parallel such as is specifically illustrated in FIG. 5.

The barrel 60 may also be utilized to retrieve OBS units from deployment on the seabed 14. Specifically, such retrieval can be accomplished by positioning discharge port 70 of barrel 60 over a deployed OBS unit so that said unit is axially aligned with barrel 60 and thereafter lowering the flared portion 74 of barrel 60 around said unit 22 until the deployed unit 22 seats within discharge port 70. As subsequent deployed units 22 are retrieved, retrieved units 22 will be caused to move axially along barrel 60 towards second end 64.

Figure 7:
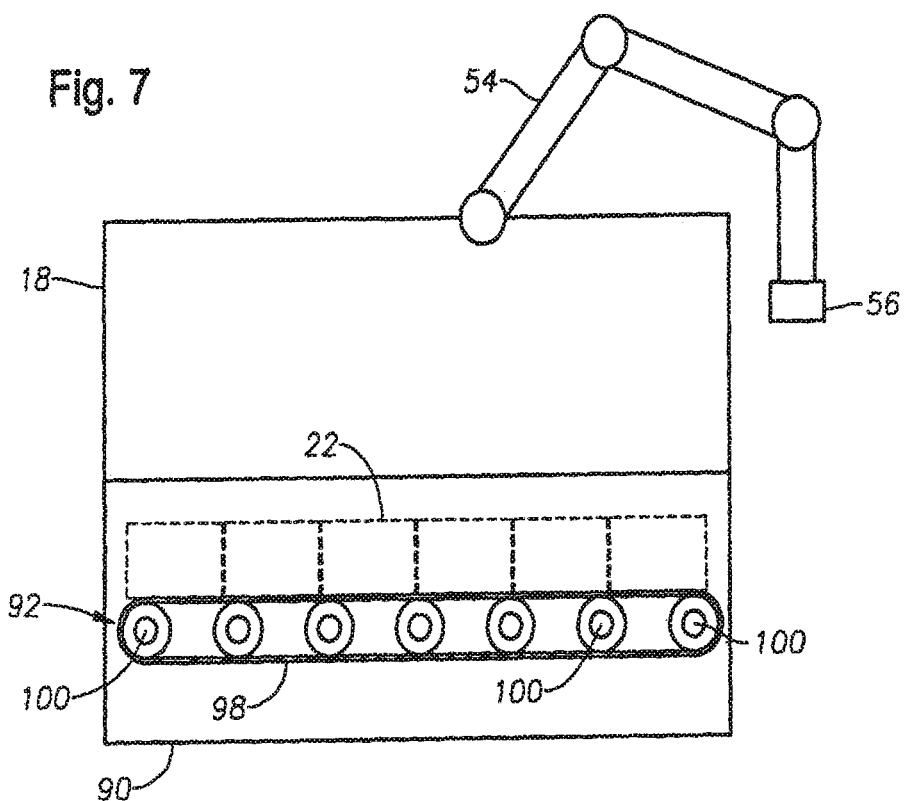
FIG. 7 is a side view of a conveyor belt utilized in the carrier of FIG. 6

FIGS. 6 and 7 illustrate another embodiment of carrier 20 in which carrier 20 comprises a frame 90 and one or more movable conveyor belts 92 mounted on frame 90. In FIG. 6, three conveyor belts 92 are illustrated. Each conveyor belt 92 is defined by a first end 94 and a second end 96 and comprises a flexible belt or track 98 and at least two rollers 100 on which belt 98 is mounted. Frame 90 is provided with at lest one discharge port 102. Conveyor belt 92 is disposed for receipt of a plurality of units 22 and is positioned in frame 90 so that second end 96 of conveyor belt 92 is adjacent discharge port 102. Actuation of conveyor belt 92 causes units 22 seated thereon to be moved from a first position to a second position. Such actuation can be used to both "adjust" the weight distribution of units 22 seated in carrier 20, as well as deliver units 22 to a position adjacent discharge port 102. Buoyancy material 103 may also be attached to carrier 20 in order to further assist with weight and buoyancy control.

In one embodiment, deployment of a unit 22 simply involves positioning carrier 20 adjacent the seabed 14 at the desired location where a unit 22 is to be planted. Once in position, a unit 22 can simply be rolled off of the second end 96 of conveyor belt 92. Frame 90 may include a guide 104 to ensure that a deployed unit 22 remains properly oriented as it is deposited on seabed 14.

In another embodiment, a variety of discharge mechanisms may be used to cause an OBS unit 22 to be deployed from carrier 20 via discharge port 102. In one embodiment, frame 90 includes a spring mechanism 52a adjacent port 102 wherein spring mechanism 52 urges unit 22 through port 102. In another embodiment, frame 90 may include a pivotal release lever or door 52b that blocks discharge port 102. Door 52b can be selectively activated to open, thereby permitting a unit 22 seated adjacent discharge port 102 to be deployed therethrough.

A robotic arm 54 may be used in the alternative to the above described discharge mechanisms or in concert therewith. Robotic arm 54 preferably includes a clamping mechanism 56 that can engage a unit 22 and extract said unit from discharge port 102.

In the illustrated embodiment, conveyor belt 92 is linear, although conveyor belt 92 may be non-linear for purposes of the invention. Likewise, while conveyor belt 92 is illustrated as a flexible belt, conveyor may be a track or similar mechanism to provide conveyance of a unit 22 from a first position to a second position.

This conveyor-type carrier 20 may also be used to easily retrieve units and convey them back to vessel 16. Units 22 deployed on the seabed 14 may be engaged directly by conveyor belt 92 or may be engaged by robotic arm 54 and placed on conveyor belt 92 adjacent port 102. Conveyor belt 92 may then be activated to move the unit 22 toward first end 94, thereby making space available on conveyor belt 92 adjacent port 102 for another retrieved unit. Such a mechanism is also desirable for loading units 22 into carrier 20 for transport and deployment since units 22 can be quickly "fed" into carrier 20 as conveyor belt 92 is moving.

Figure 8:
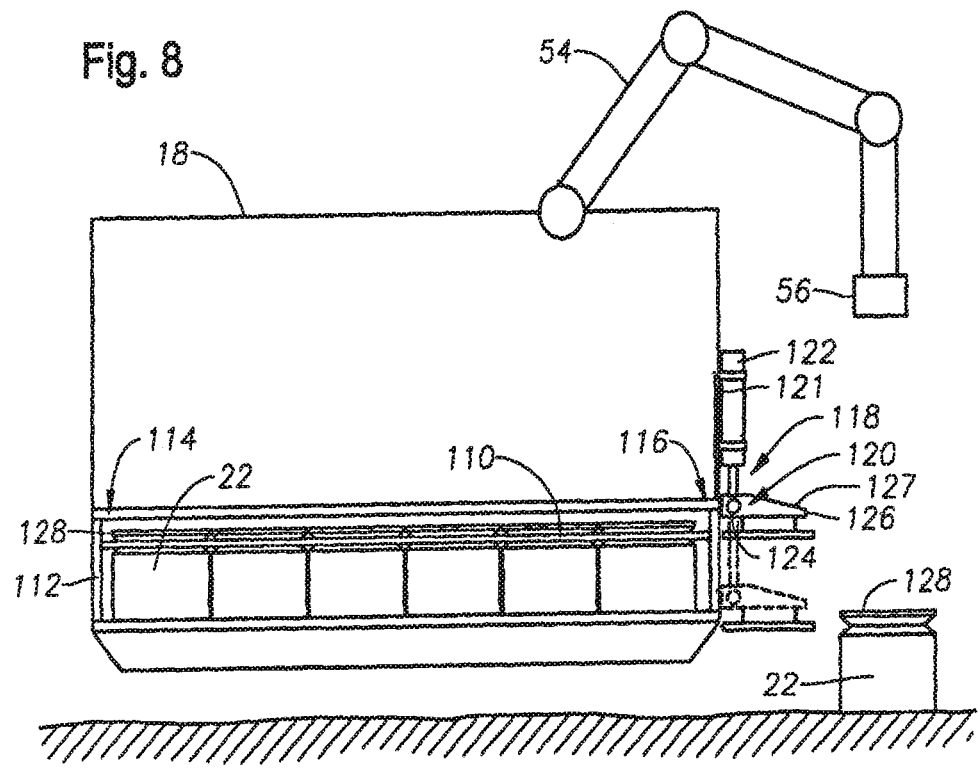
FIG. 8 is a cut-away side view of a carrier system employing rails to deliver OBS units.

With reference to FIGS. 8, 9 and 10, there is shown another embodiment of carrier 20 in which OBS units 22 are carried and slidably movable on parallel rails 110 mounted within a frame 112. In the illustrated embodiment, rails 110 are rigidly mounted within frame 112 and form a linear path for movement of units 22 thereon. In another embodiment, parallel rails 110 form a non-linear path. Further, while only one set of rails 110 may be used, preferably three parallel sets of rails are utilized to increase the number of units 22 that can be carried by carrier 20. In any event, rails 110 are defined by a first end 114 and a second end 116, wherein the second end 116 of said rails terminate adjacent a discharge port 118 provided in frame 112.

Also positioned adjacent discharge port 118 are movable deployment rails 120. Deployment rails 120 are disposed to move perpendicular to rails 110 from a first position in which deployment rails 120 are aligned with rails 110 to a second position in which deployment rails 120 are disposed to release and/or engage units 22. In the preferred embodiment, a piston 122 is used to move deployment rails 120 between the first and second positions. A fence 121 or similar barrier may be attached to deployment rails 120 perpendicular thereto so as to be positioned adjacent discharge port 118 when deployment rails 120 move to the second position, thereby preventing a unit 22 disposed on rails 110 adjacent the discharge port 118 from sliding off of rails 110. Deployment rails 120 may also be disposed to partially rotate and/or move out from frame 112 as rails 120 travel to the second position, thereby facilitating release of an OBS unit therefrom.

Deployment rails 120 are further defined by a first end 124 and a second end 126. When deployment rails 120 are in the first position, first end 124 thereof is aligned with the second end 116 of rails 110 so that units 22 can slide therebetween. The second end 126 of rails 124 may be tapered to form a fork, as shown at 127, to facilitate engagement of OBS units 22. Specifically, the forked second end 126 of rails 124 can be utilized to engage and retrieve OBS units 22 that are deployed on seabed 14.

Units 22 are disposed to slidingly move along rails 110 and 124. In one preferred embodiment illustrated best in FIGS. 8 and 10, units 22 may include a cap 128 having opposing sides 130 that are notched as is shown at 132 for engagement by said rails 110 and 124. Cap 128 may form a part of unit 22 or may be removably attached thereto. Furthermore, cap 128 may be formed of a buoyant material such as foam in order to lighten the overall load of carrier 20. Likewise, frame 112 may have a buoyant material 134 attached thereto.

A variety of discharge mechanisms may be used to cause an OBS unit 22 to be deployed from deployment rails 124. In one embodiment, frame 112 includes a spring mechanism 52a adjacent port 114 wherein spring mechanism 52 urges unit 22 through port 114 onto rails 124. In another embodiment, frame 112 may include a pivotal release lever or door 52b that blocks discharge port 114. Door 52b can be selectively activated to open, thereby permitting a unit 22 seated adjacent discharge port 114 to be deployed therethrough onto deployment rails 124. Similar discharge mechanisms may be utilized on rails 124 to deploy a unit 22 seated thereon.

A robotic arm 54 may be used in the alternative to the above described discharge mechanisms or in concert therewith. Robotic arm 54 preferably includes a clamping mechanism 56 that can engage a unit 22 and extract said unit from rails 124.

As shown in FIG. 8, a rail-type carrier 20 as described above is preferably attached to the bottom of ROV 18 so that the overall center of gravity of the ROV/carrier system remains low and ROV 18 remains in an upright position.

In each case of the above-described carriers, the carrier is attached to the lower portions of ROV 18 so that the center of gravity of the overall ROV/carrier system is lower than the center of buoyancy for the system. In the event of a loss of power, the system will remain upright and can more easily be retrieved.

Additionally, in each of the above-described embodiments, multiple OBS units are shuttled down to the seabed and back to the surface utilizing an ROV and more specifically, a carrier attached directly to the ROV. This eliminates the need for separate baskets as described in the prior art and the drawbacks associated therewith.

In another preferred embodiment of the deployment method, as illustrated in FIG. 11, OBS units 22 are sequentially delivered to the seabed 140 from a vessel or platform 142 by sliding units 22 down a deployment line 144 to an ROV 18 positioned adjacent seabed 140. Deployment line 144 is defined by a first end 146 attached to vessel 142 and a second end 148 attached to ROV 18. ROV 18 may be operated from a tether management system 26 or directly from vessel 142 by way of a tether or umbilical cord 24. Preferably, deployment line 144 runs substantially parallel to tether 24, or alternatively, deployment line 144 forms a part of tether 24 or is otherwise secured to tether 24. Deployment line 144 is attached to ROV 18 so as to permit OBS units 22 sliding down line 144 to be removed therefrom and placed on the seabed in the desired location. Deployment line 144 is attached to the ROV 18 so as to move in conjunction with ROV 18, obviating the need for ROV to return to a central location to retrieve OBS units 22 for deployment.

A robotic arm 154 is preferably used to remove OBS units 22 from deployment line 144 and place units 22 on seabed 140. ROV 18 alternatively may be provided with a launch device to which line 144 is attached, whereby the launch device causes OBS units 22 to be disengaged from line 144 and released onto the seabed 140.

In an alternative embodiment of this method, second end 148 of deployment line 144 is attached to a fixed object 150 or secured directly to the seabed 140. In each case, however, the delivery method permits OBS units 22 to be transported down deployment line 144 for receipt and deployment by ROV 18.

The method as described herein provides an "on time" OBS unit delivery system so that a unit 22 arrives for deployment just as ROV 18 is moving into position on seabed 140 for placement of unit 22. Such a system eliminates the need for the prior art basket system in which an ROV was constantly required to return to a central distribution point and the need for independent, free-floating lines in the water. Those skilled in the art will appreciate that to the extent the deployment line 144 is attached to ROV 18, deployment line 144 is drivable, hence the likelihood of entanglement with other lines is significantly reduced.

Furthermore, because of the relatively long travel time necessary for an OBS unit 22 to travel down deployment line 144 from vessel 142 to ROV 18, multiple OBS units 22 may be traveling down deployment line 144 simultaneously, albeit spaced apart accordingly, to permit ROV 18 to detach and "plant" an OBS unit 22 prior to the arrival of the next OBS unit.

Figure 12:
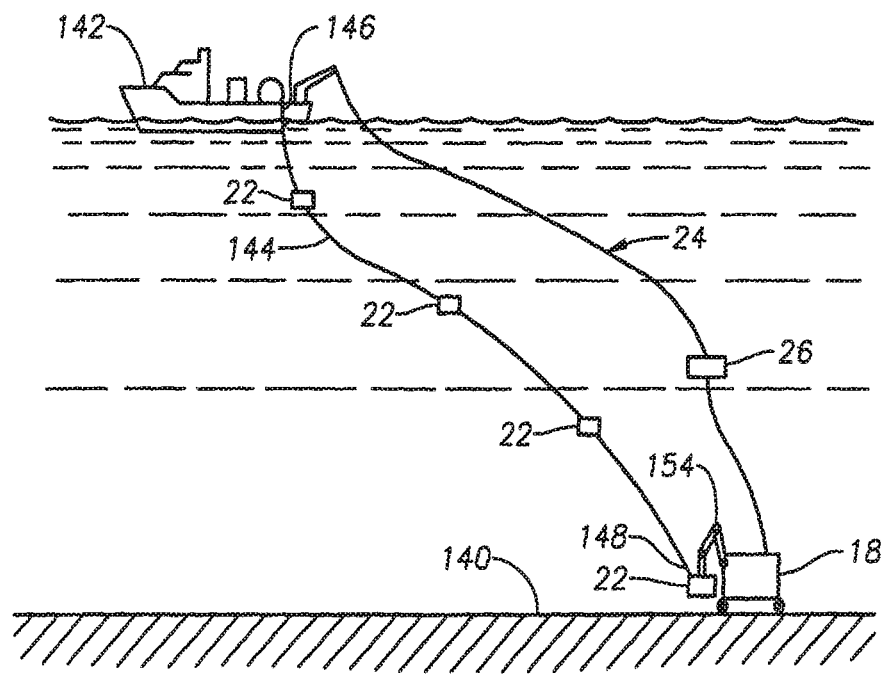
FIG. 12 is a schematic view of seismic operations in deep water showing another embodiment of "on time" deployment of OBS receiver units by utilizing an ROV to place units attached to a deployment line payed out from the surface.

In another preferred embodiment of the "on time" deployment method, as illustrated in FIG. 12, OBS units 22 are attached at spaced intervals along a deployment line 144 that is payed out from a surface vessel or platform 142 and placed on the seabed 140 by an ROV 18 as the ROV 18 moves along a desired layout path on seabed 140. Deployment line 144, which may be a continuous cable or a set of interconnected segments, is of sufficient length to accommodate the placement of a desired number of OBS units 22 along a layout line. The OBS units 22 are attached to the deployment line 144 at intervals sufficient to allow proper deployment spacing along the layout line, taking into account the added length needed for possible seabed 140 irregularities.

Figure 13:
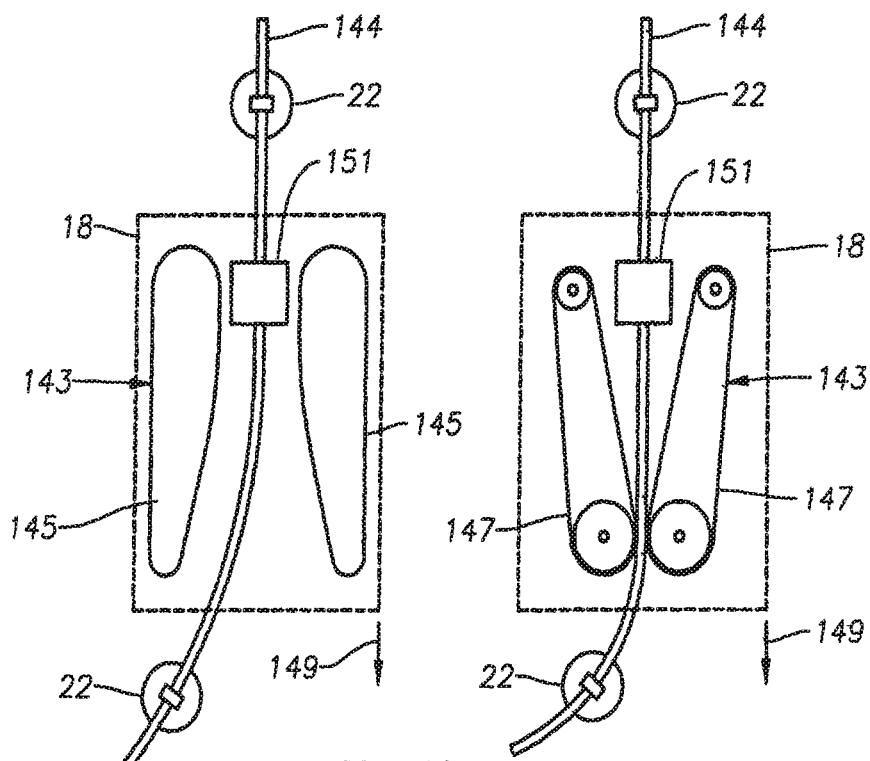
FIG. 13 is a cut away top view of the deployment line guide disposed on the underside of an ROV.

More specifically, as further illustrated in FIG. 13, line 144 is engaged by a guide 143 disposed on ROV 18. In one preferred embodiment, guide 143 is formed of opposing, fixed chute members 145 attached to the lower side of ROV 18. In another preferred embodiment, guide 143 is formed of opposing, movable traction members 147 attached to the lower side of ROV 18. A non-limiting example of a traction member is a wheel or tractor track commonly utilized in a squirter engine to engage and propel a non-rigid or semi-rigid line. In either case, line 144 is threaded through guide 143 so as to be between the opposing members. As such, movement of ROV 18 in a forward direction, illustrated by arrows 149, causes line 144, as well as OBS units 22 attached thereto, to be drawn down underneath ROV 18 and to be passed through guide 143. As an OBS unit 22 passes through guide 143, it is caused to be coupled to seabed 140. In one embodiment, to enhance engagement of OBS units 22 with seabed 140, guide 143 may include a plate 151 or similar structure positioned between opposing members. As line 144 passed through guide 143, an OBS unit 22 contacting plate 151 will be urged downward into coupling contact with seabed 140.

In any event, preferably, opposing members are aligned so as to be substantially parallel with the direction of forward movement of ROV 18. Forward movement of ROV 18 along a desired deployment line will thereby cause line 144 to be drawn down and laid along the desired deployment line. To the extent guide 143 utilizes traction members 147, such members may be disposed to rotate counter to one another while simultaneously engaging line 144, thereby functioning to "squirt" line 144 through guide 143 and providing a positive drive mechanism to actively pull line 144 down from the surface.

The apparatus and method in this embodiment provide an "on time" OBS unit delivery system so that OBS units 22 arrive for deployment just as ROV 18 is moving into position on seabed 140. Such a system eliminates the need for the prior art basket system in which an ROV was constantly required to return to a central distribution point, wasting valuable time. Elimination of the prior art basket system also eliminates independent, free-floating lines in the water and the drawbacks associated therewith. In contrast, line 144 of the invention is "controlled", and hence the likelihood of entanglement with other lines is significantly reduced, since line 144 is paid out from the back deck 142 at the water surface and secured by guided ROV 18 at the seabed 140.

Figure 14:
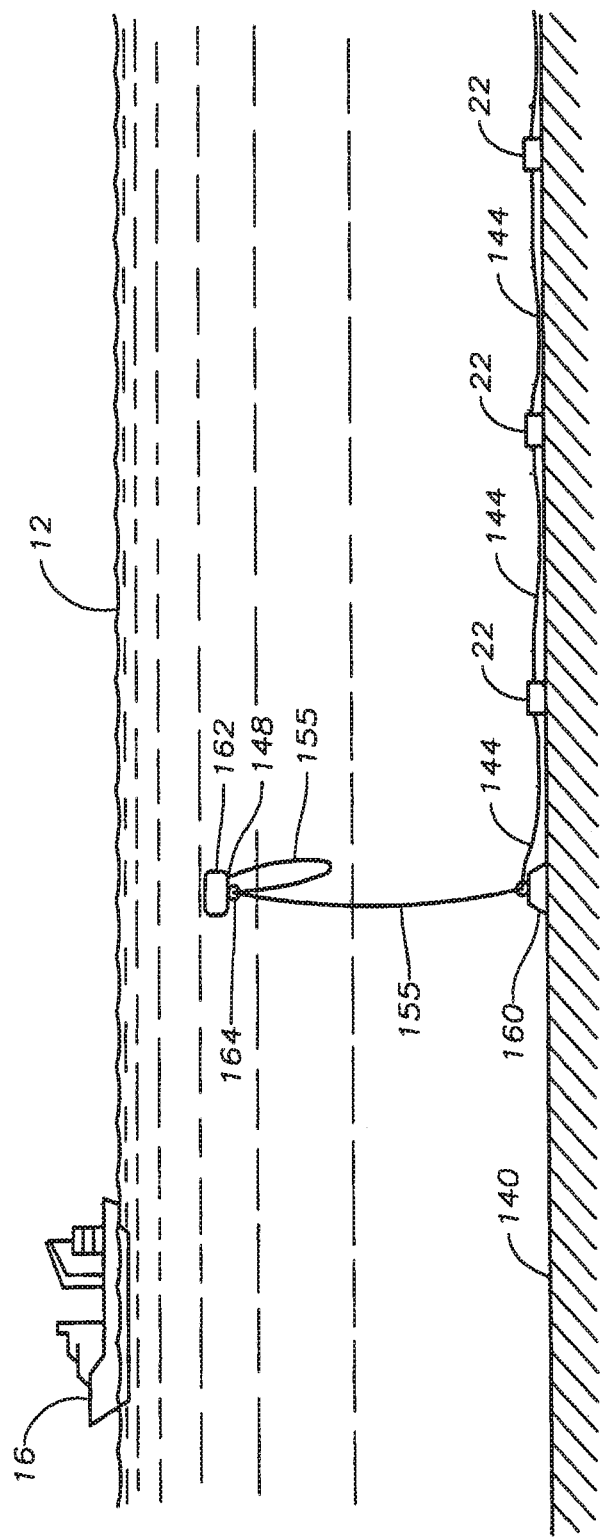
FIG. 14 is a schematic view of a plurality of autonomous, interconnected OBS units laid out on the seabed with a retrieval buoy and acoustic release device attached thereto.

Referring to FIG. 14, a retrieval system for line 144 is shown. As illustrated, an anchor weight 160 may be attached to line 144 some distance away from the last OBS unit 22 on line 144. Anchor 160 is preferably positioned on the seabed 140 by ROV 18 so that the line 144 is slack and not under tension between the last OBS unit 22 and anchor 160. A positively buoyant buoy 162 is attached to anchor 160 by a buoy line 155. Buoy line 155 is of sufficient length to extend from anchor 160 to the surface. In the preferred embodiment, to avoid interference with surface vessels, buoy 162 is releasably secured a desired distance below the surface by an acoustical release device 164 that attaches to buoy line 155. Retrieval of OBS units 22 from seabed 140 is thus achieved by acoustically activating acoustical release 164, whereby buoy 162 floats to the surface for recovery. Line 155, anchor 160 and line 144 can then be "reeled in" so that OBS units 22 disposed on line 144 are sequentially retrieved.

In each of the described embodiments of the invention, by utilizing an ROV or similar remote deployment mechanism, OBS units can be placed accurately on the seabed in the desired position. Likewise, proper orientation can be ensured, as can a high degree of coupling. While the system has been described utilizing only one ROV, those skilled in the art will appreciate that such a system could easily utilize multiple ROV without creating the entanglement problems of the prior art since the ROV, and hence the lines attached thereto, are all drivable. Multiple ROVs also provide redundancy in the event that an ROV breaks down or is otherwise disabled. Thus, in the event of an ROV breakdown, operations can continue while the disabled ROV is repaired. In this same vein, utilizing at least two ROVs, one ROV can always be shuttling between the surface and the seabed while the other ROV is physically deploying units on the seabed.

In the preferred embodiment, each OBS unit is wireless and self-contained so that no communication, control or operation action is required between the ROV and the OBS units. Preferably, operation of the OBS units has been initiated prior to deployment from the deck of the deployment vessel, or alternatively, prior to handling by the ROV at the seabed. In this regard, each ROV 18 may be provided with a camera and each OBS unit 22 may be provided with a visual beacon, such as a strobe light, which visual beacon is operative only when the OBS unit is operating within predetermined parameters. To the extent a parameter is out of range or the unit is otherwise not functioning properly, the visual beacon will indicate the malfunction. Once an OBS unit 22 has been placed on the seabed, the camera on the ROV 18 can be utilized to ensure desired operability of the OBS unit. As a non-limiting example, operability parameters may include, but are not limited to battery charge, orientation, coupling, and recording parameters. Thus, in the event an OBS unit parameter does not fall within the desired range, the problem can be immediately identified while the ROV is "on site." Hence corrective measures can be taken or the defective ROV can be replaced without interfering with the subsequent seismic operations.

Alternatively, monitoring and control functions may be provided by a wireless communication modem, such as, for example an acoustical or electromagnetic device, disposed in OBS unit 22 and attached to ROV 18. In this case, an OBS unit may be checked concerning the aforementioned parameters and control commands may be given to the unit to do a variety of things, such as, for example, starting and stopping recording, changing recording parameters, performing special tests, retrieving data, etc. when the unit and ROV are within communication range.

The ROV/carrier system can also be utilized to retrieve deployed OBS units from the seabed and transport them back to the surface vessel. A carrier containing retrieved OBS units can be detached from the ROV at the surface and moved to a location on the vessel for processing and servicing of the OBS units. Preferably, such units are removed from the carrier and seismic data extraction takes place on the deck. Thereafter, the OBS units are charged, tested, re-synchronized, and OBS unit operation is re-initiated. OBS units that have been processed in this regard can be loaded back into the carrier for reuse.

Preferably, each OBS unit is activated while on-board the seismic vessel and deactivated once pulled from the ocean, such that it is continuously acquiring data from before the time the ROV begins a trip down to the seabed. However, as mentioned above, recording may be initiated remotely using wireless modems.

On the deck of the seismic vessel, carriers are preferably stackable in order to maximize deck space. A robotic arm, overhead gantry, crane or the like may be positioned on the deck to move carriers and ROVs. Likewise, the vessel would include an OBS unit handling system to load and unload carriers, as well as to perform various tasks on the OBS units, such as data extraction, testing and charging.

While certain features and embodiments of the invention have been described in detail herein, it will be readily understood that the invention encompasses all modifications and enhancements within the scope and spirit of the following claims.

The invention claimed is:

1. A system for deployment of ocean bottom seismic data receivers into a body of water having a surface and a seabed, comprising:
   a remotely operated vehicle (ROV) comprising a first wireless communication device;
   a seismic data receiver deployed on the seabed comprising a second wireless communication device, the first wireless communication device configured to communicate with the second wireless communication device, wherein the first wireless communication device and second wireless communication device each include at least one of an electromagnetic modem, a radio frequency modem, an acoustic modem, or an optical modem;
   the ROV further configured to:
      move to a position adjacent to the seismic data receiver; and
      establish a wireless link with the seismic data receiver via the first communication device and second wireless communication device.

2. The system of claim 1, wherein the first wireless communication device is attached to the ROV and the second wireless communication device is attached to the seismic data receiver, the first wireless communication device and the second wireless communication device each includes at least one of a wireless modem, an acoustic communication device, an electromagnetic communication device, an optical communication device, a radio frequency communication device, or an inductive communication device.

3. The system of claim 1, wherein the wireless link includes at least one of an electromagnetic link, radio frequency link, optical link, acoustic link, and inductive link.

4. The system of claim 1, wherein the ROV is further configured to:
   activate the seismic data receiver via at least one of the second wireless communication device or the wireless link;
   operate the seismic data receiver via at least one of the second wireless communication device or the wireless link; and
   perform quality control via the wireless link.

5. The system of claim 1, wherein the ROV is further configured to:
   initiate an operation of the seismic data receiver prior to deployment;
   instruct, via the wireless link, the seismic data receiver to record at or near a time the seismic data receiver is deployed; and initiate, via the wireless link, recording of the seismic data receiver at or near the time the seismic data receiver is deployed.

6. The system of claim 1, wherein the ROV is further configured to:
monitor the seismic data receiver via at least one of the second wireless communication device or the wireless link; and
control a function of the seismic data receiver via the at least one of the second wireless communication device or the wireless link.

7. The system of claim 1, wherein the seismic data receiver is recording data, and wherein the ROV is further configured to:
stop recording of the seismic data receiver via the second wireless communication device;
change recording parameters of the seismic data receiver via the second wireless communication device; and
perform tests via the second wireless communication device.

8. The system of claim 1, wherein the seismic data receiver is recording data, and wherein the ROV is further configured to:
retrieve the data from the seismic data receiver via the wireless communication device,
wherein the ROV and the seismic data receiver are within wireless communication range.

9. The system of claim 1, wherein the ROV is further configured to:
initiate an operation of the seismic data receiver via the wireless link; and
evaluate the operation of the seismic data receiver via the wireless link.

10. A method of deploying ocean bottom seismic data receivers into a body of water having a surface and a seabed, comprising:
providing a remotely operated vehicle (ROV) with a first wireless communication device;
providing a seismic data receiver with a second wireless communication device;
configuring the first wireless communication device to communicate with the second wireless communication device;
deploying the seismic data receiver on the seabed;
guiding the ROV to a position adjacent the deployed seismic data receiver;
establishing a wireless link between the ROV and the seismic data receiver via the first and second wireless communication devices;
activating, by the ROV, the seismic data receiver via at least one of the second wireless communication device or the wireless link;
operating, by the ROV, the seismic data receiver via at least one of the second wireless communication device or the wireless link; and
performing, by the ROV, quality control via the wireless link.

11. The method of claim 10, wherein the first wireless communication device is attached to the ROV and the second wireless communication device is attached to the seismic data receiver, the first wireless communication device and the second wireless communication device each include at least one of a wireless modem, an acoustic communication device, an electromagnetic communication device, an optical communication device, a radio frequency communication device, or an inductive communication device.

12. The method of claim 10, wherein the wireless link includes at least one of an electromagnetic link, radio frequency link, optical link, acoustic link, and inductive link.

13. The method of claim 10, wherein the first and second wireless communication devices each include at least one of an electromagnetic modem, a radio frequency modem, an acoustic modem, and an optical modem.

14. The method of claim 10, further comprising:
initiating, by the ROV, an operation of the seismic data receiver prior to deployment;
instructing, by the ROV, via the wireless link, the seismic data receiver to record at or near a time the seismic data receiver is deployed; and
initiating, by the ROV, via the wireless link, recording of the seismic data receiver at or near the time the seismic data receiver is deployed.

15. The method of claim 10, further comprising:
monitoring, by the ROV, the seismic data receiver via at least one of the second wireless communication device or the wireless link; and
controlling, by the ROV, a function of the seismic data receiver via the at least one of the second wireless communication device or the wireless link.

16. The method of claim 10, wherein the seismic data receiver is recording data, the method further comprises:
stopping, by the ROV, recording of the seismic data receiver via the second wireless communication device;
changing, by the ROV, recording parameters of the seismic data receiver via the second wireless communication device; and
performing, by the ROV, tests via the second wireless communication device.

17. The method of claim 10, wherein the seismic data receiver is recording data, and the method further comprises:
retrieving, by the ROV, the data from the seismic data receiver via the wireless communication device,
wherein the ROV and the seismic data receiver are within wireless communication range.

18. The method of claim 10, further comprising:
initiating, by the ROV, an operation of the seismic data receiver via the wireless link; and evaluating, by the ROV, the operation of the seismic data receiver via the wireless link.

* * * * *